United States Patent Office 2,956,064
Patented Oct. 11, 1960

2,956,064

1,4-BENZODIOXEPIN-2,5-(3H)-DIONE

Fred Kagan and Robert D. Birkenmeyer, Kalamazoo Township, Kalamazoo County, Mich., assignors to The Upjohn Company, Kalamazoo, Mich., a corporation of Michigan No Drawing. Filed Aug. 13, 1958, Ser. No. 754,704

6 Claims. (Cl. 260—340.2)

This invention relates to novel chemical compounds and to a process for their preparation and is more particularly concerned with the compound 1,4-benzodioxepin-2,5-(3H)-dione and a process for its preparation.

The novel compound of the invention is 1,4-benzodioxepin-2,5-(3H)-dione and can be represented by the following structure:

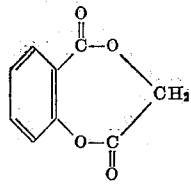

It is an object of the invention to provide the novel compound having the above formula. Other objects of the invention will be apparent to those skilled in the art to which this invention pertains.

The compound of the invention has been found to possess activity as an anti-inflammatory agent. Further, the compound of the invention reacts very readily with water at ambient laboratory temperatures, that is to say, temperatures of the order of twenty degrees centigrade. The product of the reaction is the known compound, salicyloylglycolic acid (see German Patent 125,988 and German Patent 555,931). This property of the compound of the invention renders it useful as a reagent for the removal of traces of moisture from organic solvents such as benzene, toluene, ether, and the like. The compound of the invention is also useful as an intermediate in chemical synthesis. For example, the compound of the invention reacts readily with primary and secondary amines to yield the corresponding secondary and tertiary amides of salicyloylglycolic acid. Illustratively, 1,4-benzodioxepin-2,5-(3H)-dione reacts with pyrrolidine to yield 1-pyrrolidinylcarbonylmethyl salicylate according to the following equation:

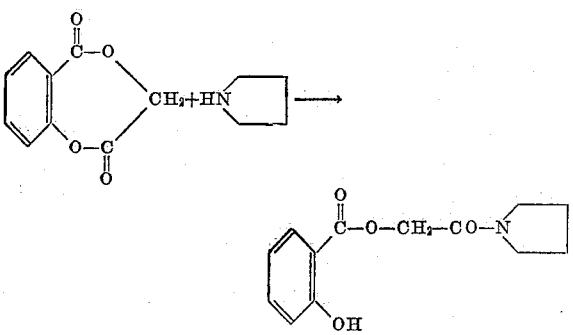

The above reaction is of a general nature and in the place of pyrrolidine there can be used any primary or secondary amine.

The compound 1-pyrrolidinylcarbonylmethyl salicylate obtained as described above exhibits antiviral activity. In addition, the compound exhibits keratolytic activity and can be formulated as a powder or ointment for the treatment of mycotic and other infections of the feet.

The compound 1,4-benzodioxepin-2,5-(3H)-dione can be prepared by reacting iodoacetylsalicylic acid with a tertiary amine in the presence of an inert organic solvent. In order to obtain optimum yields it is essential that the reaction be carried out under substantially anhydrous conditions, otherwise the desired product will be converted to salicyloylglycolic acid as hereinbefore described. Accordingly the reactants and the reaction vessel are dried vigorously before the reaction is carried out and moisture is excluded from the reaction vessel throughout the reaction. The reaction is carried out advantageously by admixing the reactants and the inert solvent and maintaining the reaction temperature within the range of about zero degrees to about eighty degrees centigrade, preferably between about 25 and about eighty degrees centigrade for a period of from about one to about ten hours. The product can be isolated from the reaction mixture by conventional means provided that for the reasons given above, the desired product is not brought into contact with water at room temperature or above during the isolation process. In a convenient method of isolation, the reaction mixture is distilled under reduced pressure to remove the solvent, the residue is dissolved in a solvent, for example, chloroform, shaken rapidly with ice-cold water to remove tertiary amine hydriodide, and the solution is dried and evaporated to yield the desired product. The latter can then be purified by conventional procedures, for example, by recrystallization from anhydrous solvents.

The tertiary amines which can be employed in the process of the invention include tertiary aliphatic amines such as trimethylamine, triethylamine, tri-n-butylamine, N,N-dimethylbenzylamine, and the like, N,N-dialkylanilines such as N,N-dimethylaniline, N,N-diethylaniline, and the like, heterocyclic tertiary bases such as pyridine, quinoline, isoquinoline, and the like, and N-alkylpiperidines such as N-methylpiperidine, N-ethylpiperidine, and the like.

The tertiary amine which is employed in the process of the invention is desirably present in at least equimolar proportion based on the amount of iodoacetylsalicylic acid employed. If desired, the amount of tertiary amine employed can be in excess of the equimolar proportion based on iodoacetylsalicylic acid.

The solvents which can be employed in the process of the invention are those organic solvents which are inert under the conditions of the reaction, that is to say do not react with the iodoacetylsalicylic acid or with the desired compound of the invention. Advantageously the solvent employed in the reaction is a lower aliphatic ketone, such as acetone, methyl ethyl ketone, methyl isobutyl ketone, and the like. Other solvents which can be employed include lower aliphatic esters such as ethyl acetate, amyl acetate, and the like, lower aliphatic ethers such as diethylether, diisopropyl ether, and the like, and lower aromatic hydrocarbons such as benzene, toluene, xylene, and the like.

The iodoacetylsalicylic acid which is employed as starting material in the process of the invention can be prepared by methods which have been described in the literature; for example, by the process described in German Patent 221,384. In a preferred form of the process of the invention, however, the iodoacetylsalicylic acid is prepared by reacting chloroacetylsalicylic acid with sodium iodide in the presence of the inert solvent which is to be employed in the process of the invention, separating the sodium chloride which is precipitated, and reacting the filtrate, without isolation of the iodoacetylsalicylic acid so formed, with a tertiary amine under the conditions described above. Although it is preferable to remove the sodium chloride precipitated in the formation of the iodoacetylsalicylic acid, it is not essential to do so and the sodium chloride can be allowed to remain in the reaction mixture during the next stage.

In the preparation of iodoacetylsalicylic acid by the method described above it is desirable to employ an amount of sodium iodide which is at least equimolar based on the amount of chloroacetylsalicylic acid. It is preferable to employ an amount of sodium iodide in excess of equimolar proportions and this excess can be as great as five times the equimolar proportion. The solvents which can be employed in the reaction are those solvents which can be employed in the main process of the invention as hereinbefore described. The conversion of chloroacetylsalicylic acid to iodoacetylsalicylic acid is preferably carried out at a temperature of the order of twenty to eighty degrees centigrade. The reaction time is advantageously at least one hour and is preferably of the order of several hours.

The following examples are illustrative of the product and process of the present invention but are not to be construed as limiting.

EXAMPLE 1

*1,4-benzodioxepin-2,5-(3H)-dione*

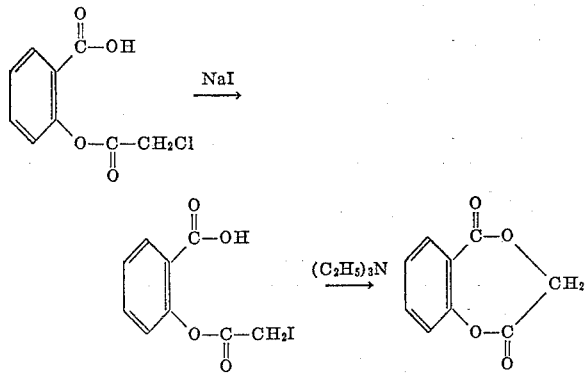

In thoroughly dried equipment 3.3 grams (0.0154 mole) of chloroacetylsalicylic acid, 2.3 grams (0.0154 mole) of sodium iodide and sixty milliliters of anhydrous acetone were heated under reflux for two hours in an atmosphere of nitrogen. The sodium chloride (0.810 gram; ninety percent of theory) which had separated was removed by filtration in an atmosphere of nitrogen and 1.6 grams (0.0158 mole) of triethylamine was added to the filtrate which was then heated under reflux for one hour. The solvent was removed under reduced pressure and the semi-solid residue was dissolved in chloroform which was extracted rapidly with three portions of ice-water. The chloroform solution was dried over anhydrous magnesium sulfate and evaporated to yield an oil which crystallized after trituration with ice-cold isopropyl alcohol. The solid which separated was recrystallized from a mixture of benzene and methylcyclohexane. There was thus obtained 1,4-benzodioxepin-2,5-(3H)-dione in the form of a crystalline solid having a melting point of 115 to 115.5 degrees centigrade. The ultraviolet absorption spectrum of the compound (in solution in ethanol) exhibited maxima at 239 millimicrons and 307 millimicrons. The infrared absorption spectrum of the compound (mineral oil mull) exhibited maxima at 1795, 1730, 1613, 1586, 1320, 1223, 1205, 797, 785, 765, 702, and 685 reciprocal centimeters.

*Analysis.*—Calcd. for $C_9H_6O_4$: C, 60.68; H, 3.40. Found: C, 60.49; H, 3.30.

EXAMPLE 2

*Salicyloylglycolic acid*

The procedure described in Example 1 was repeated with the exception that the chloroform solution of the crude reaction product was washed with water at room temperature in place of ice-water. There was thus obtained salicyloylglycolic acid in the form of a crystalline solid having a melting point of 131 to 132 degrees centigrade [German Patent 125,988 gives a melting point of 132 degrees centigrade]. This compound gave a positive ferric chloride reaction. The ultraviolet absorption spectrum of the compound (in solution in ethanol) exhibited maxima at 238 millimicrons and 307 millimicrons. The infrared absorption spectrum of the compound (mineral oil mull) exhibited maxima at 3230, 2760, 2640, 2540, 1723, 1687, 1615, 1585, 1490, 1283, 1267, 1248, 1235, 945, 925, 900, 745, and 695 reciprocal centimeters.

EXAMPLE 3

*1-pyrrolidinylcarbonylmethyl salicylate*

In thoroughly dried equipment 17.8 grams (0.1 mole) of 1,4-benzodioxepin-2,5-(3H)-dione, 7.1 grams (0.1 mole) of pyrrolidine (previously dried over potassium hydroxide) and fifty milliliters of acetone (previously dried over anhydrous calcium chloride) were heated under reflux for one hour. The solvent was removed under reduced pressure and the residue was recrystallized from a mixture of ethyl acetate and methylcyclohexane. There was thus obtained 1-pyrrolidinylcarbonylmethyl salicylate in the form of a crystalline solid having a melting point of 130 to 131.5 degrees centigrade. The infrared absorption spectrum of the compound (mineral oil mull) exhibited maxima at 3230, 1668, 1650, 1606, 1579, 1476, 759, and 730 reciprocal centimeters.

*Analysis.*—Calcd. for $C_{13}H_{15}NO_4$: C, 62.64; H, 6.07; N, 5.62. Found: C, 62.54; H, 6.11; N, 5.57.

The above procedure can be carried out using any primary or secondary amine in place of pyrrolidine, thereby producing the corresponding secondary or tertiary amide of salicyloylglycolic acid. For example, by employing, in place of pyrrolidine, the following amines. methylamine, ethylamine, diethylamine, n-butylamine, cyclohexylamine, cyclopentylamine, aniline, benzylamine, 1-naphthylamine, morpholine, piperidine, piperazine, and ethylenediamine there can be prepared respectively: N - methysalicyloylglycolamide, N - ethysalicyloylglycolamide, N,N-diethylsalicyloylglycolamide, N - n - butysalicyloylglycolamide, N - cyclohexylsalicyloylglycolamide, N - cyclopentylsalicyloylglycolamide, N - phenylsalicyloylglycolamide, N - benzylsalicyloylglycolamide, N-1-naphthylsalicyloylglycolamide, 4 - morpholinylcarbonylmethyl salicylate, 1-piperidinylcarbonylmethyl salicylate, 1,4-di-(salicyloylglycolyl) piperazine, and N,N'-di-(salicyloylglycolyl)ethylenediamine. The above amides exhibit antiviral activity. In addition, they exhibit keratolytic activity and can be formulated as powders or ointments for the treatment of mycotic and other infections of the feet.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 1,4-benzodioxepin-2,5-(3H)-dione.

2. A process for the preparation of 1,4-benzodioxepin-2,5-(3H)-dione which comprises dehydrohalogenating iodoacetylsalicylic acid with an acid-accepting tertiary amine under anhydrous conditions in the presence of an inert organic solvent at a temperature within the range of about zero degrees centigrade to about eighty degrees centigrade.

3. The process of claim 2 in which the tertiary amine is triethylamine.

4. The process of claim 2 in which the tertiary amine is present in at least equimolar proportion with respect to the iodoacetylsalicylic acid.

5. In a process for the preparation of 1,4-benzodioxepin-2,5-(3H)-dione, the steps of reacting chloroacetylsalicyclic acid with at least an equimolar proportion of sodium iodide in the presence of an inert solvent and cyclizing under anhydrous conditions the solution of iodoacetylsalicylic acid so obtained by treatment with at least an equimolar proportion of an acid-accepting tertiary amine to form 1,4-benzodioxepin-2,5-(3H)-dione and the hydriodide of said tertiary amine.

6. The process of claim 5 in which the tertiary amine is triethylamine.

References Cited in the file of this patent

Hahn et al.: Chemical Abstracts, vol. 13, pp 725–726 (1919).